US011677219B2

(12) United States Patent
Wittmann

(10) Patent No.: US 11,677,219 B2
(45) Date of Patent: Jun. 13, 2023

(54) BRAIDED SHIELD DE-BRAIDER MACHINE

(71) Applicant: Virginia Panel Corporation, Waynesboro, VA (US)

(72) Inventor: Walter Wittmann, Staunton, VA (US)

( * ) Notice: Subject to any disclaimer, the term of this patent is extended or adjusted under 35 U.S.C. 154(b) by 310 days.

(21) Appl. No.: 16/830,816

(22) Filed: Mar. 26, 2020

(65) Prior Publication Data

US 2020/0328582 A1 Oct. 15, 2020

Related U.S. Application Data

(60) Provisional application No. 62/832,536, filed on Apr. 11, 2019.

(51) Int. Cl.
H02G 1/12 (2006.01)
H01B 7/02 (2006.01)

(52) U.S. Cl.
CPC ......... H02G 1/1297 (2013.01); H02G 1/1285 (2013.01); H01B 7/0266 (2013.01); H02G 1/1248 (2013.01)

(58) Field of Classification Search
CPC .. H02G 1/1297; H02G 1/1285; H02G 1/1248; H01B 7/0266
See application file for complete search history.

(56) References Cited

U.S. PATENT DOCUMENTS

| 3,720,973 A | 3/1973 | Bogese |
| 4,326,316 A * | 4/1982 | Dolenti .................... H02G 1/02 15/23 |
| 2014/0174267 A1 * | 6/2014 | Stepan .................. H02G 1/1297 83/17 |
| 2021/0327613 A1 * | 10/2021 | Atif ...................... H02G 1/1297 |
| 2022/0077666 A1 * | 3/2022 | Sorg ....................... H01R 43/28 |

FOREIGN PATENT DOCUMENTS

| DE | 1065048 B | 9/1959 |
| DE | 102016113004 A1 | 1/2018 |
| EP | 2117089 A1 | 11/2009 |

OTHER PUBLICATIONS

"Braided Shield Processing Brushing in Around Six Seconds," Bowie Elektrik GmbH.

* cited by examiner

*Primary Examiner* — Omar Flores Sanchez
(74) *Attorney, Agent, or Firm* — 24IP Law Group USA, PLLC; Timothy R DeWitt

(57) ABSTRACT

An apparatus for de-braiding a braided shield of a wire. The apparatus comprises a brush assembly having a first bristle wheel mounted on a first axis and a second bristle wheel mounted on a second axis wherein the first bristle wheel and the second bristle wheel are positioned with respect to one another to have their respective bristles brush against a braided shield of a wire placed between the first and second bristle wheels; a wheel drive motor; a first flexible drive shaft connecting the wheel drive motor to the first axis to rotate the first bristle wheel; a second flexible drive shaft connecting the first axis to the second axis to rotate the second bristle wheel; and a drive assembly, wherein the drive assembly moves the brush assembly both axially and rotationally with respect to a wire placed between the first bristle wheel and the second bristle wheel.

7 Claims, 18 Drawing Sheets

BRAIDED SHIELD DE-BRAIDER MACHINE

CROSS-REFERENCE TO RELATED APPLICATIONS

The present application claims the benefit of the filing date of U.S. Provisional Patent Application Ser. No. 62/832,536, filed by the present inventor on Apr. 11, 2019.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to cables, and more particularly, to systems and methods for de-braiding a braided shield of a cable or wire.

Brief Description of the Related Art

A variety of types and designs of cables or wires having braided shields exist in the marketplace, including but not limited to coax, twin ax, trax and quadrex cables or wires. Typical coaxial cables typically have at least a center conductor, a dielectric core, a braided shield and a jacket. To attach a coaxial connector to an end of a coaxial cable, one typically must de-braid the braided shield and fold or flare the de-braided shield over a ferrule or shield body placed over the coaxial cable jacket.

The task of de-braiding a braided shield commonly has been performed, for example, using a rotating brush and manually holding pressing the end of a coaxial cable against the rotating brush. Such a technique often provides inconsistent results.

A prior attempt to improve this manual de-braiding method is the Bowie Elektrik GmbH BSB 1005B and BSB 1017 machines. The BSB 1005 machine has a pair of brushes mounted side-by-side and a jig for holding a stripped coaxial cable. The jig is used to push the cable end into the rotating brushes and then to rotate the cable by 90 degrees.

SUMMARY OF THE INVENTION

In a preferred embodiment, the present invention is a system and method for de-braiding a braided shield of a cable. The apparatus for de-braiding a braided shield of a wire has a brush assembly, a wheel drive motor, a first drive member connecting the wheel drive motor to the first axis to rotate the first bristle wheel, a second drive member connecting the first axis to the second axis to rotate the second bristle wheel, and a drive assembly, wherein the drive assembly moves the brush assembly both axially and rotationally with respect to a wire placed between the first bristle wheel and the second bristle wheel. The brush assembly has a first bristle wheel mounted on a first axis and a second bristle wheel mounted on a second axis, wherein the first bristle wheel and the second bristle wheel are positioned with respect to one another to have their respective bristles brush against a braided shield of a wire placed between the first and second bristle wheels. Each of the first and second drive members may be a flexible drive shaft, but also could be a gear or other type of drive. The first axis and the second axis may be parallel. And a distance between the first axis and the second axis may be adjustable.

The brush assembly may further comprise a first bristle head and a second bristle head with each bristle head having a first bristle member, a second bristle member; and a first bristle wheel, wherein the first and second bristle support members are adjustably mounted to the first axis on opposite sides of the first bristle wheel.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1A:
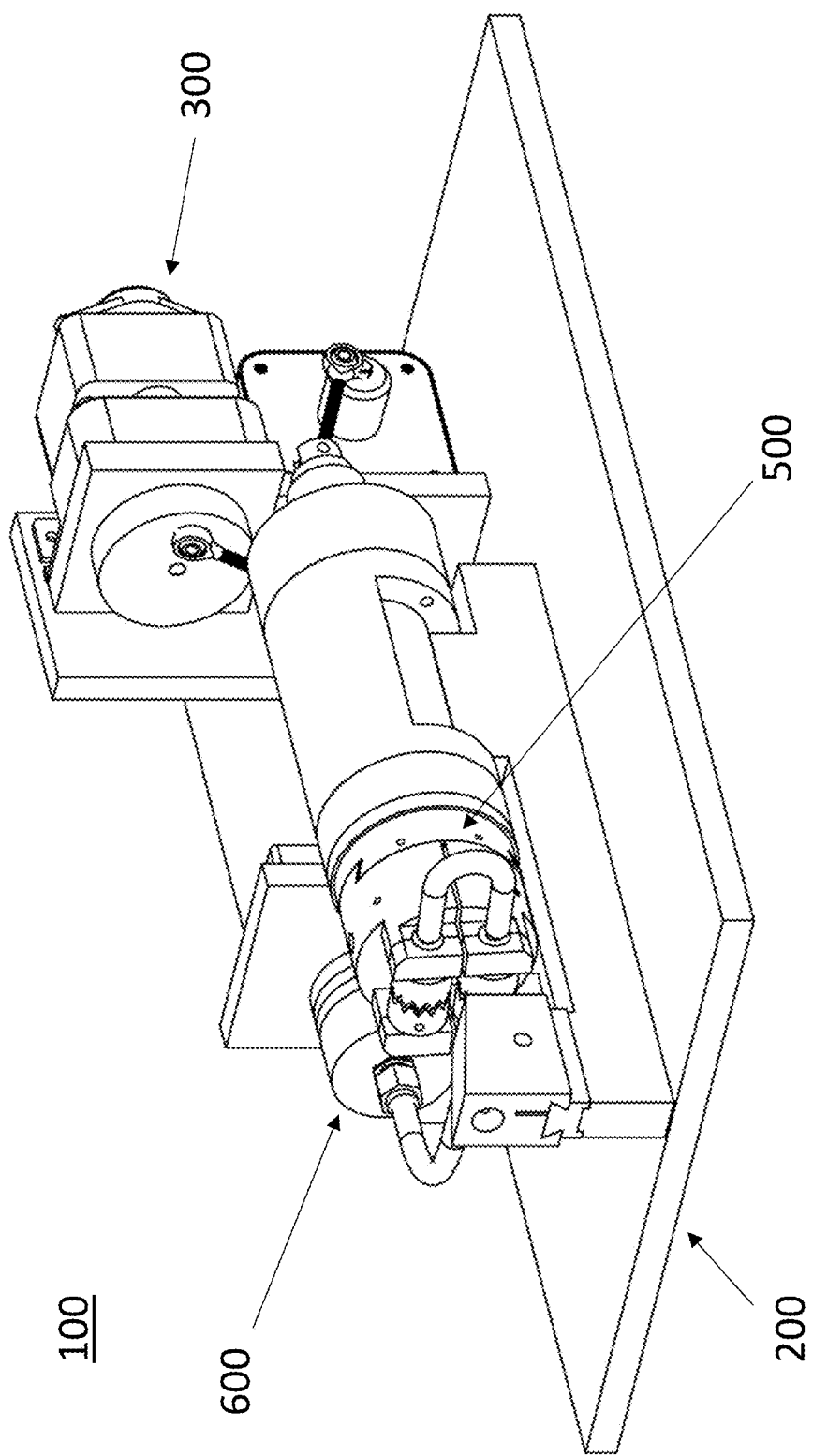
FIG. 1A is a perspective view of a de-braider machine in accordance with a preferred embodiment of the present invention.
Figure 1B:
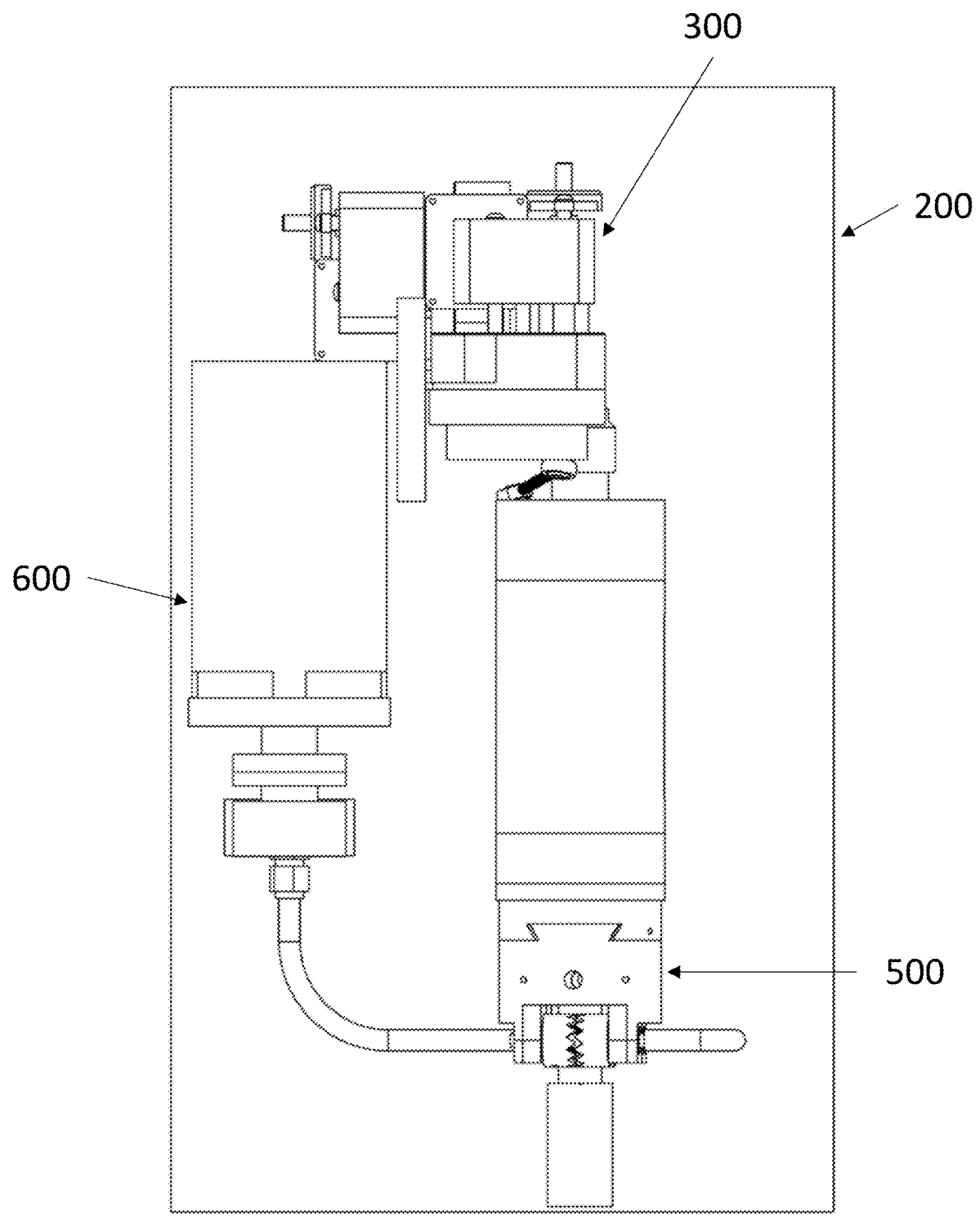
FIG. 1B is a top view of a de-braider machine in accordance with a preferred embodiment of the present invention.
Figure 1C:
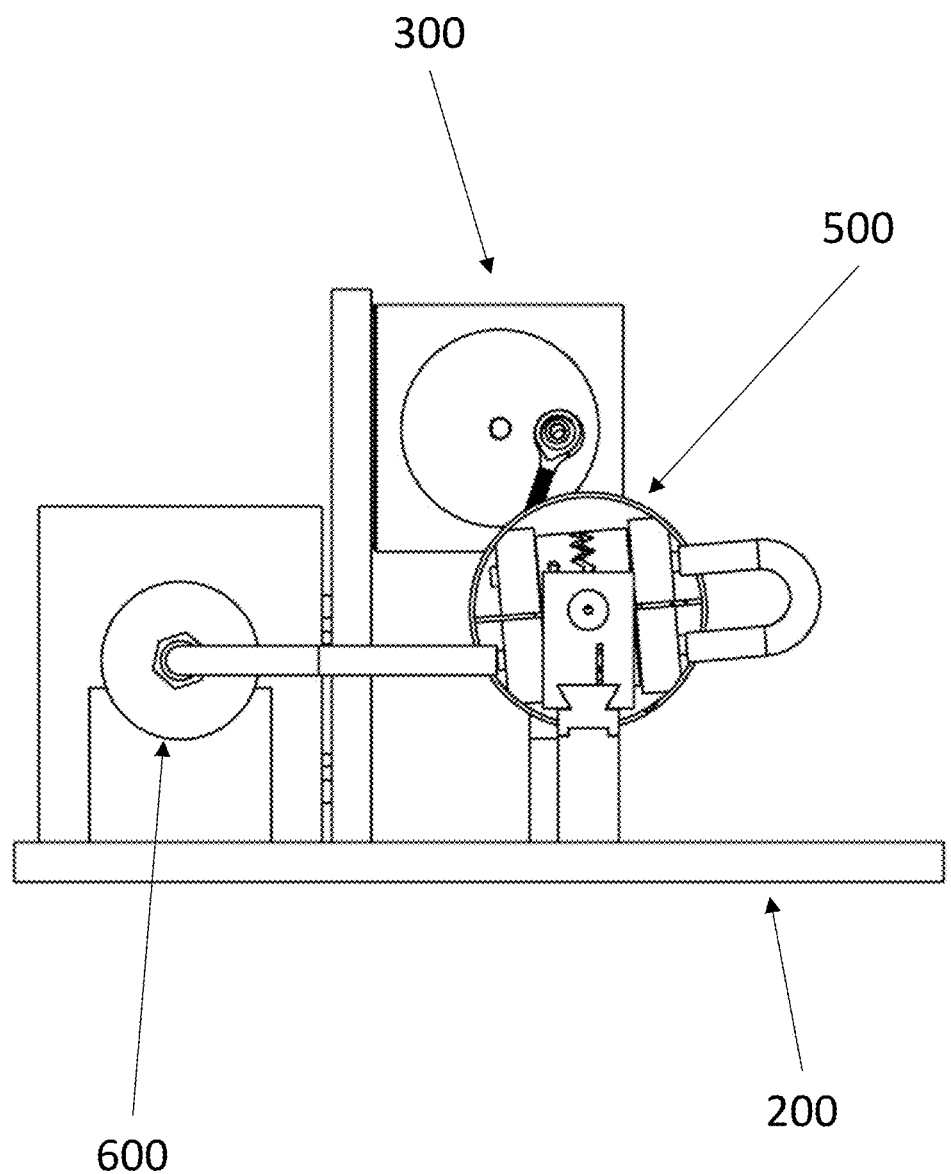
FIG. 1C is a front view of a de-braider machine in accordance with a preferred embodiment of the present invention.
Figure 1D:
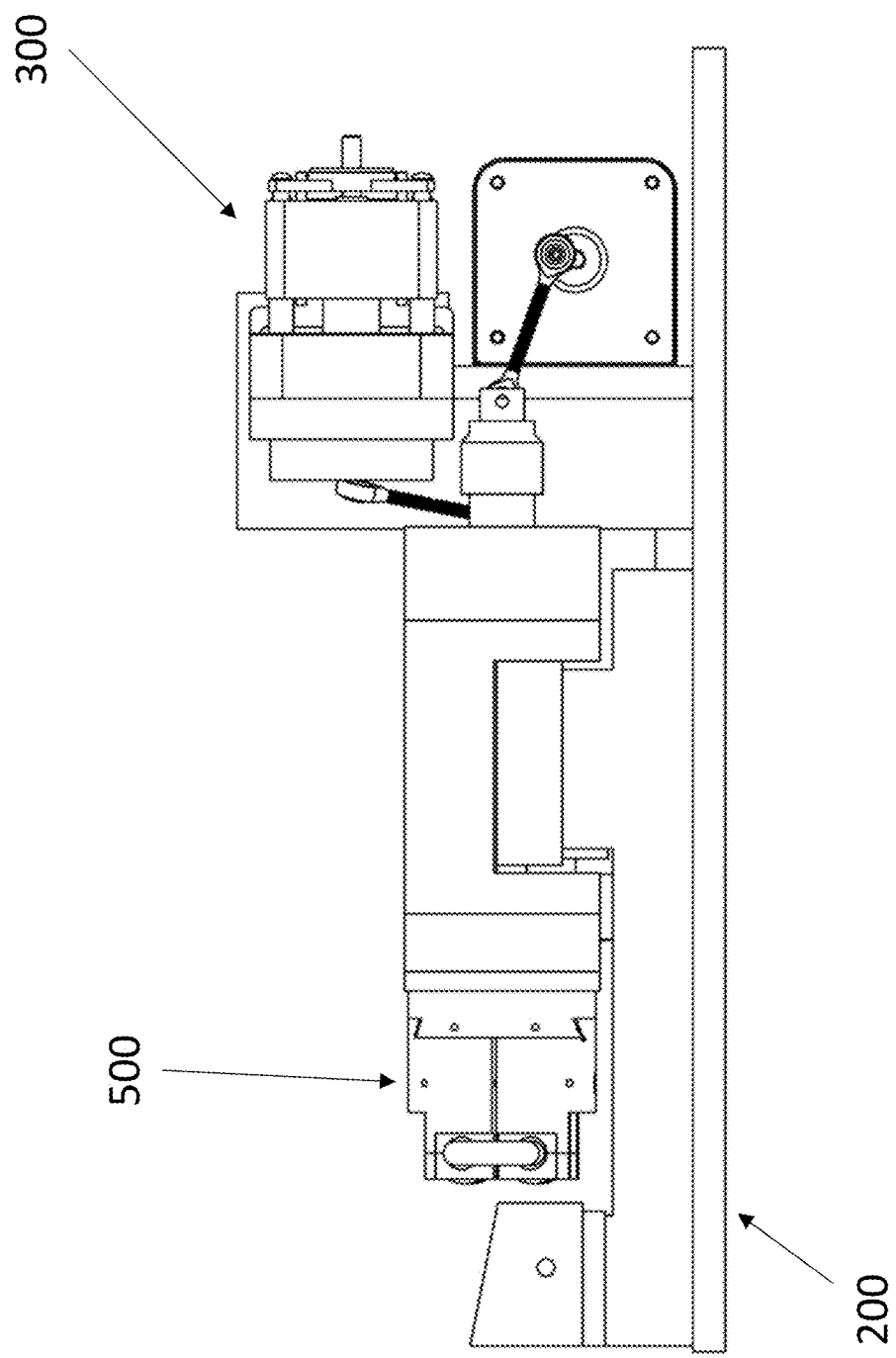
FIG. 1D is a right-side view of a de-braider machine in accordance with a preferred embodiment of the present invention.

A preferred embodiment of the present invention is described with reference to the drawings. As shown in FIGS. 1A-1E, a cable de-braider machine 100 in accordance with the present invention has a support assembly 200, a drive assembly 300, a bristle assembly 500 and a drive wheel assembly 600.

Figure 2:
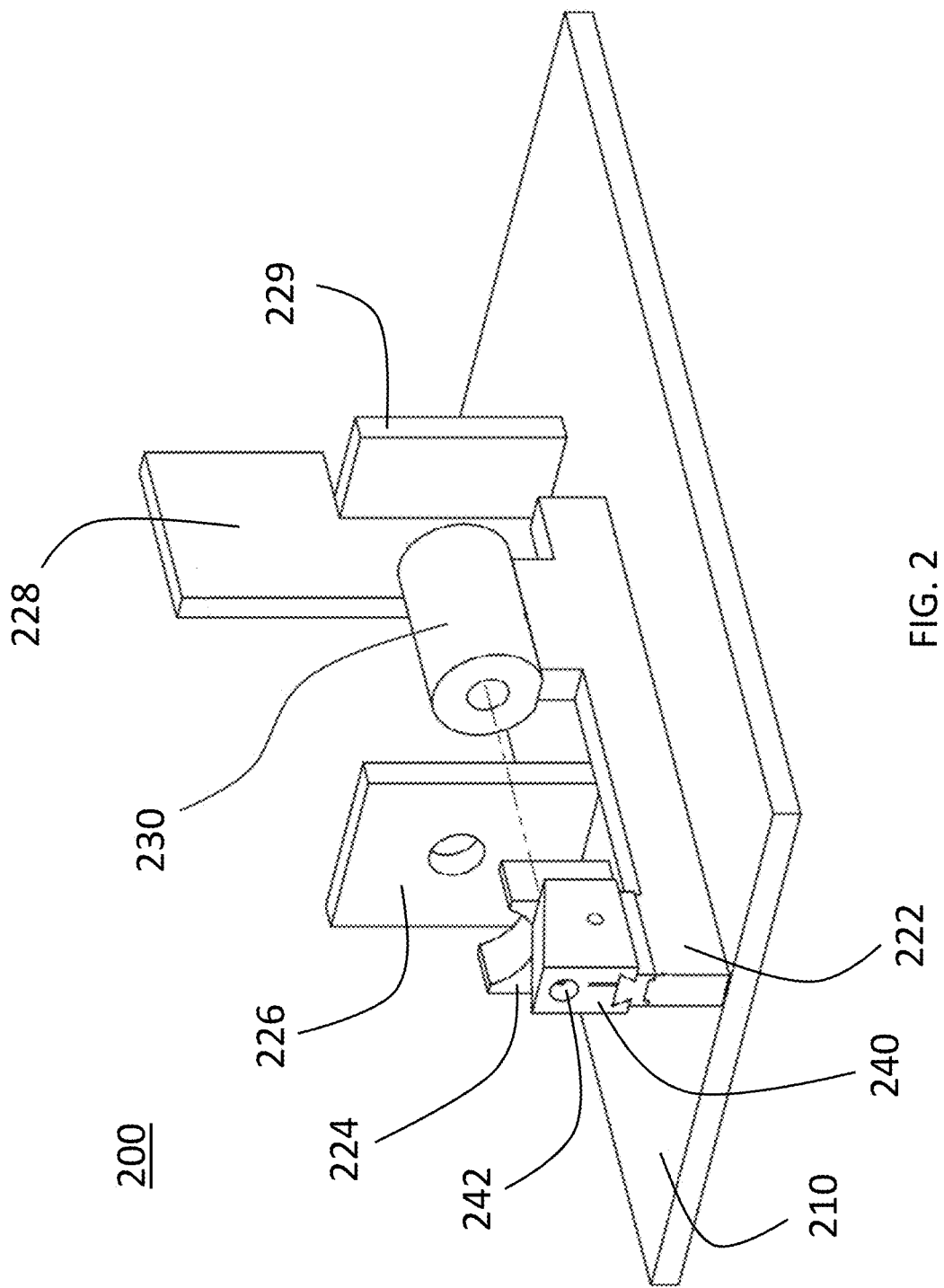
FIG. 2 is a perspective view of a support assembly in accordance with a preferred embodiment of the present invention.

As shown in FIG. 2, the support assembly has a base 2010 and a plurality of support members 222, 224, 226, 228, 229 for supporting various elements of the de-braiding machine. The support assembly 200 further has a guide holder 230 and a wire guide 240 having an opening 242 through which a cable is inserted into the de-braiding machine.

Figure 1E:
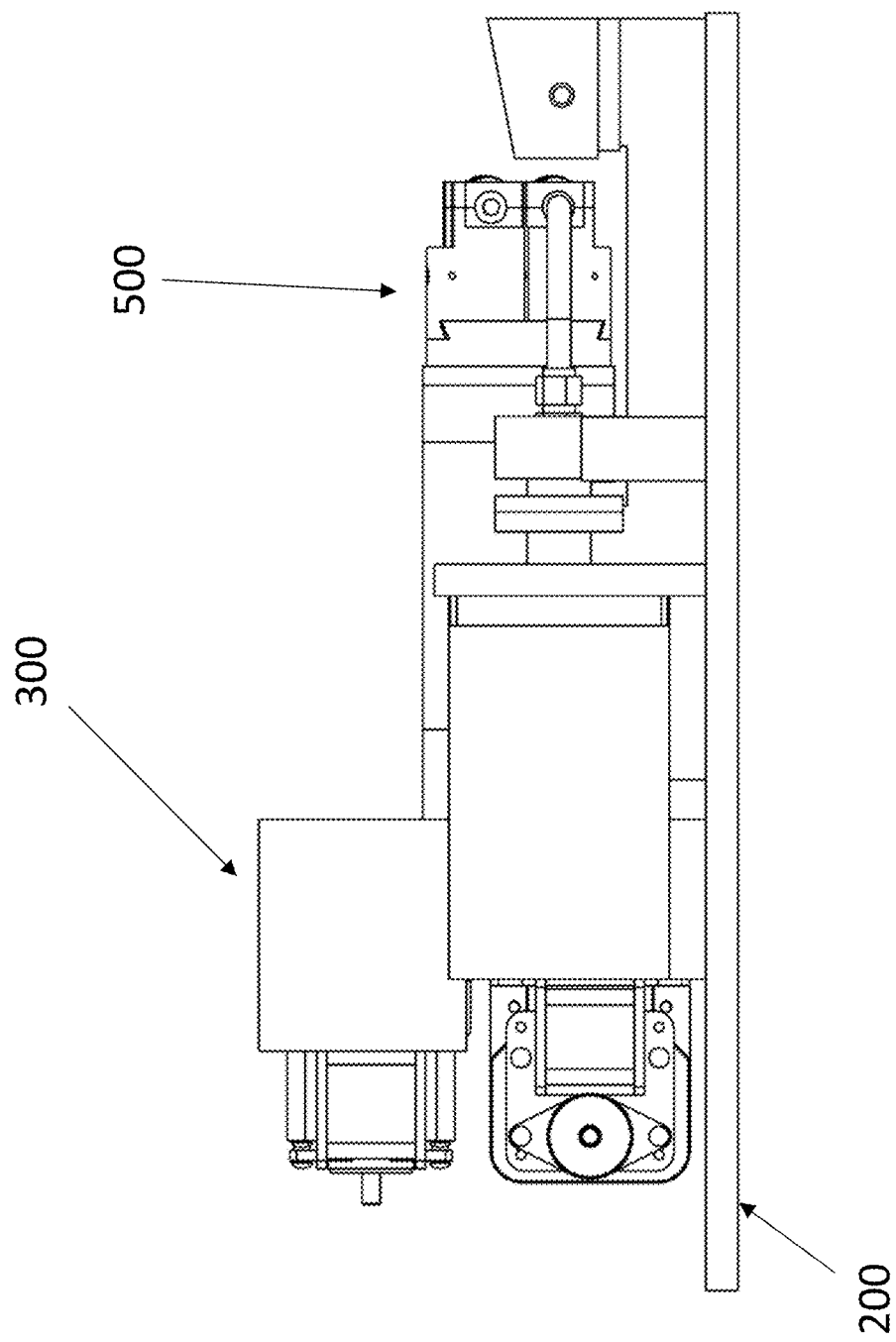
FIG. 1E is a left side view of a de-braider machine in accordance with a preferred embodiment of the present invention.
Figure 1F:
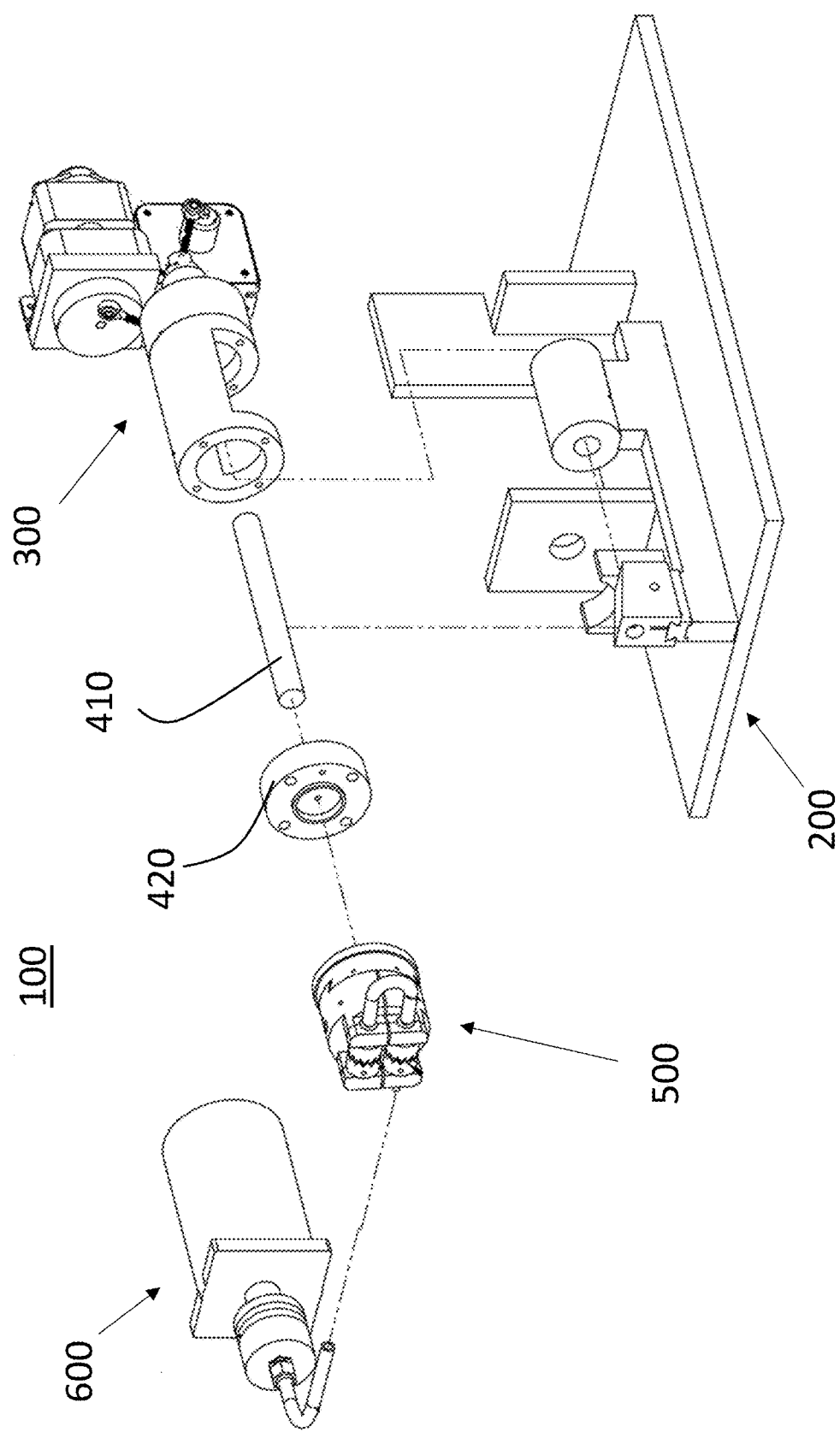
FIG. 1F is an assembly view of a de-braider machine in accordance with a preferred embodiment of the present invention.
Figure 3:
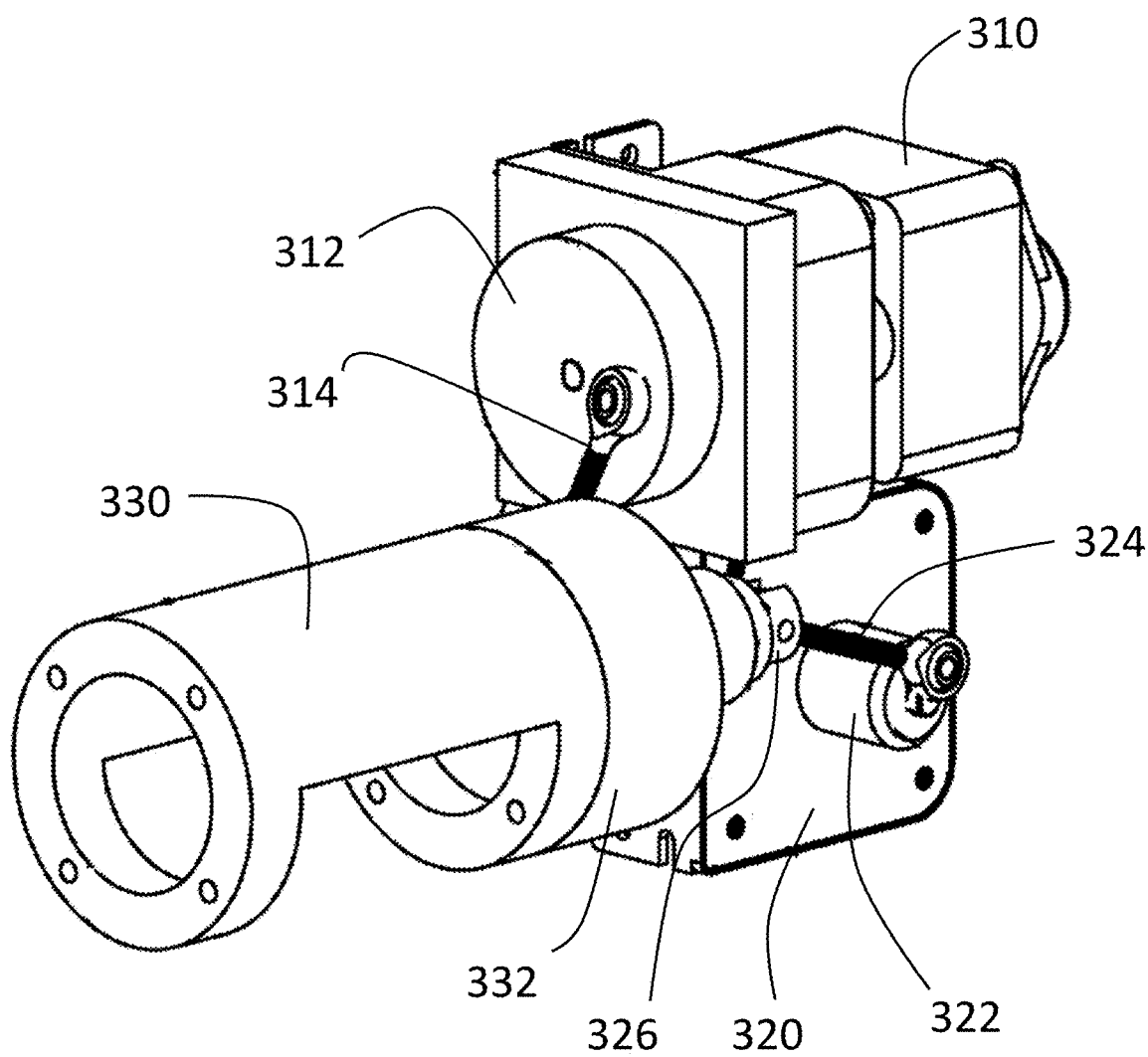
FIG. 3 is a perspective view of a drive assembly in accordance with a preferred embodiment of the present invention.
Figure 4:
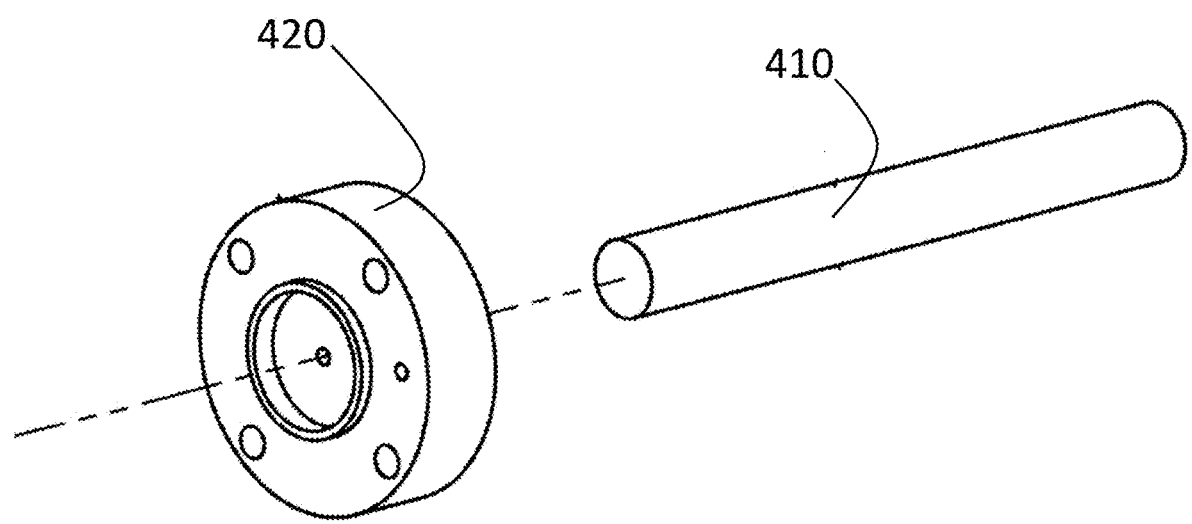
FIG. 4 is a perspective view of a guide and mount in accordance with a preferred embodiment of the present invention.

The drive assembly 300 is described with reference to FIG. 3. The drive assembly 300 provides both axial and rotational movement to the brush assembly 500. The drive assembly 300 has a rotation drive motor 310, a rotation drive crank 312, and rotation drive linkage for providing rotational (back-and-forth) movement to a body 300. The drive assembly 300 further has an axial drive motor 324, an axial drive crank 322 and axial drive linkage 324 for providing axial movement to the body 300. The axial drive linkage 324 is connected to the body 300 at axial drive mount 326 with, for example, a pin, bolt or other means. As shown in FIG. 1A, FIG. 1E and FIG. 44, the body 330 rests on a guide 410 in guide holder 330. The guide 410 guides axial movement of the body 330 and front body mount 420, which is connected to the body 330 and the guide 410, when axial movement is driven by axial drive motor 322. Further, the body 330 rotates back and forth on the guide holder 330 when rotation is driven by the rotation drive motor 310 thereby rotating the front body mount 420, which has a magnet for mounting the brush assembly 500 to the front body mount 420.

Figure 5A:
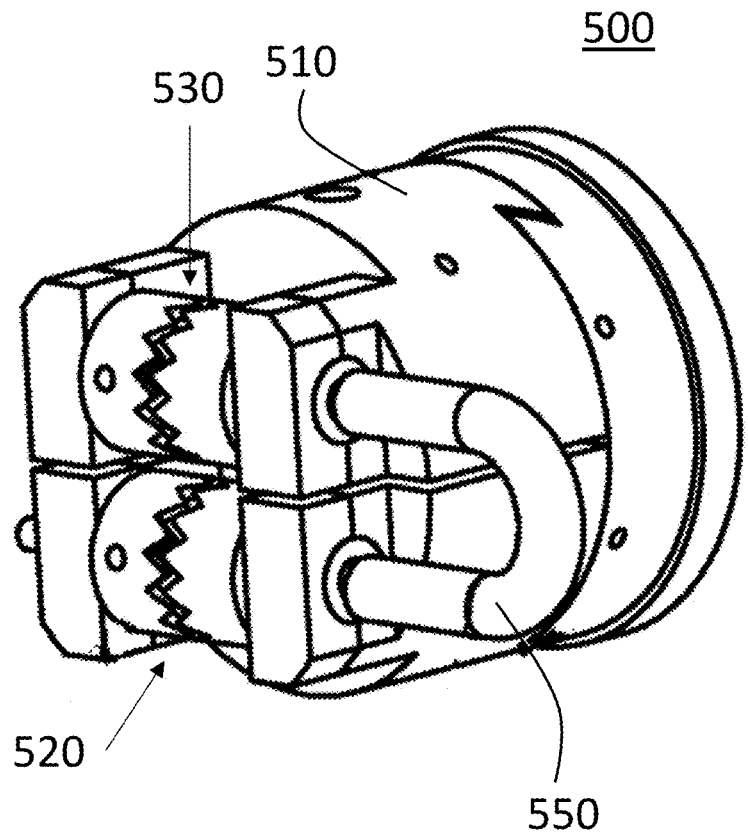
FIG. 5A is a perspective view of a brush assembly in accordance with a preferred embodiment of the present invention.
Figure 5B:
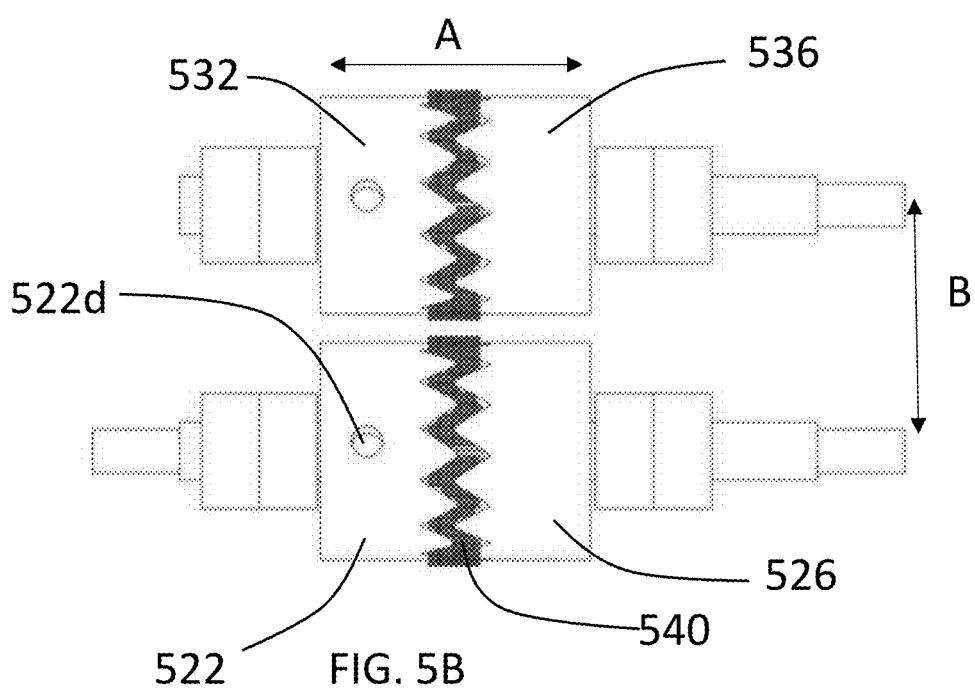
FIG. 5B is a side view of a pair of bristle holders of a brush assembly in accordance with a preferred embodiment of the present invention.
Figure 5C:
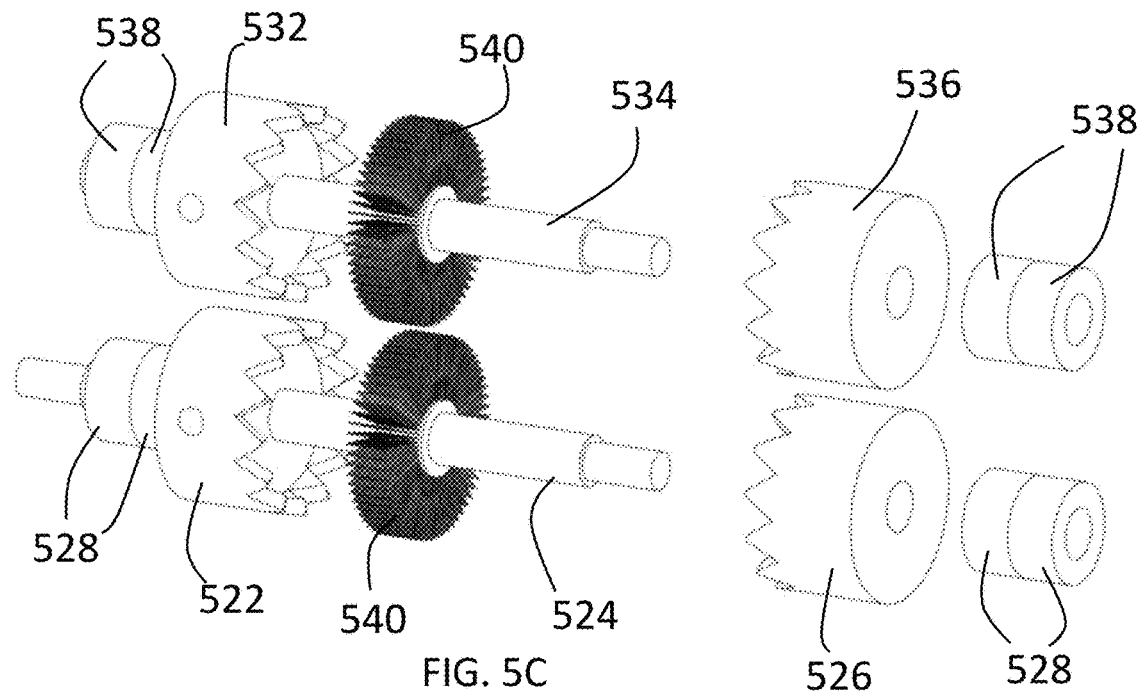
FIG. 5C is a perspective assembly view of a pair of bristle holders of a brush assembly in accordance with a preferred embodiment of the present invention.
Figure 5D:
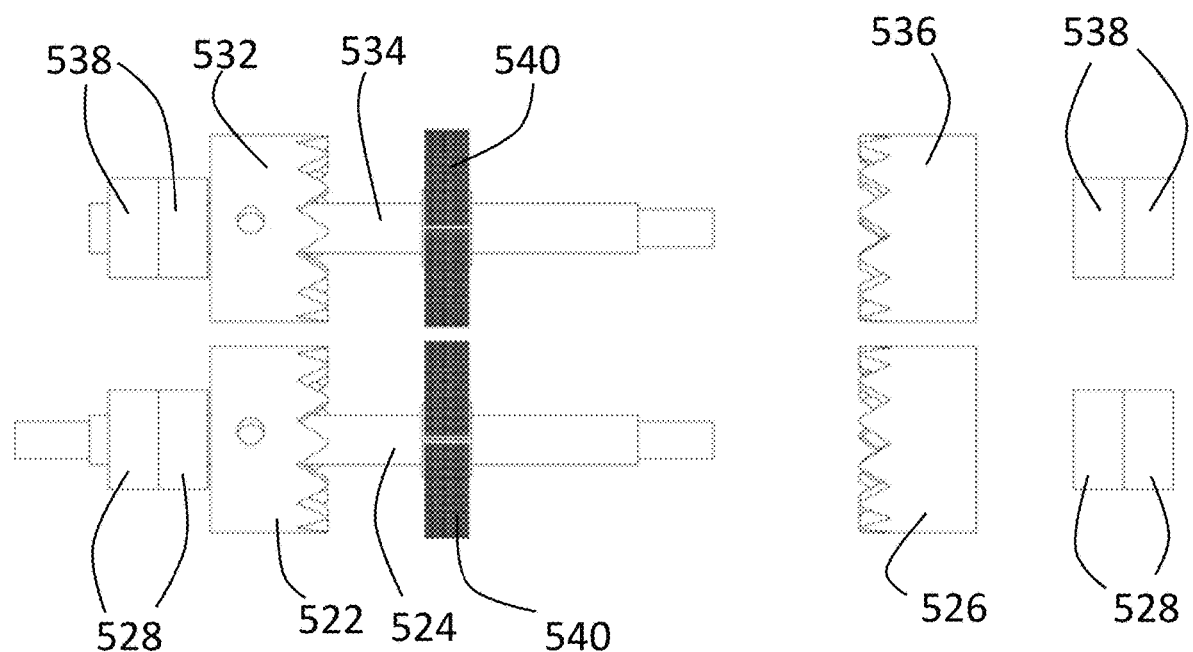
FIG. 5D is a side assembly view of a pair of bristle holders in a bristle head of a brush assembly in accordance with a preferred embodiment of the present invention.
Figure 5E:
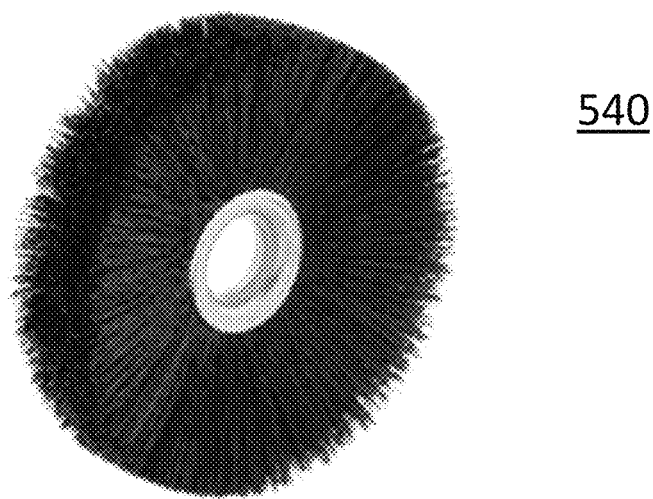
FIG. 5E is a perspective view of a bristle wheel in accordance with a preferred embodiment of the present invention.
Figure 5F:
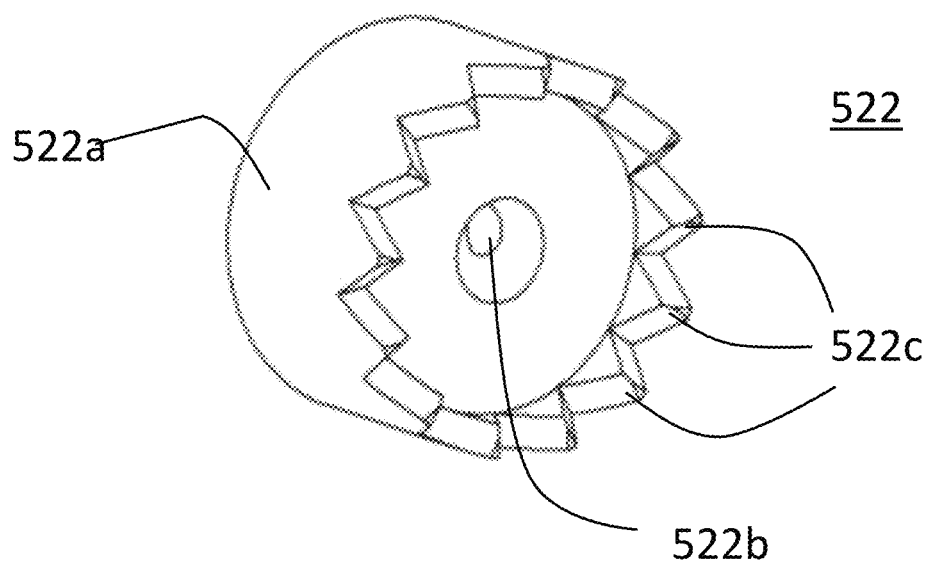
FIG. 5F is a perspective view of one side of a bristle holder in accordance with a preferred embodiment of the present invention.

The brush assembly 500 is described with reference to FIG. 5. The brush assembly 500 has a body member 510 that includes means, such as metal, for mounting the brush assembly 500 to the front body mount 420 via the magnet(s) on the front body mount. The design, of course, could be altered such that the magnet(s) is on the body member 510 rather than the front body mount 420 or on both. A pair of bristle heads 520, 530 are attached to the body member 510. As shown in FIGS. 5B-5D, each bristle head 520, 530 has a pair of bristle support members 522, 526 and 532, 536, respectively, and a bristle wheel 540 mounted on or to and axle or post 524, 534. Bearings 528, 538 may be used on the outsides of the posts 524, 534. As shown in FIG. 5F, each bristle support member 522, 526, 532, 536 has a cylindrical body 522A, a central hole 522b, a plurality of teeth 522c and an opening or hole 522d. When two bristle support members 522, 526 or 532, 536 face one another, their respective teeth form a chevron pattern. The bristle wheel 540 has a central support and a plurality of bristles circumferentially around the central support. Each bristle wheel 540 is mounted on an axle or post 524, 524 between a pair of bristle support members 522, 526 or 532, 536. Each bristle support member is secured to the axle or post 524, 524, for example, with a screw thru the hole 522d. For each pair of bristle support members 520, 530 the dimension "A" shown in FIG. 5B can be adjusted to increase or decrease the amount of pressure the pair of bristle support members places on the bristles of the bristle wheel 540 mounted between that pair of bristle support members. The angular cuts (or teeth) in the chevron pattern manipulate the splay of the nylon bristle wheels. This effectively can adjust the stiffness of the bristles on the bristle wheel. This adjusts the way the bristles protrude from the diameter of the bristle support members. They may also be manipulated by rotating the left and right side bristle support members relative to each other to have the cuts not line up perfectly but at an angular offset to manipulate the braid. Manipulating dimension "B" allows for different size wires to be de-braided. While a chevron pattern is used in the preferred embodiment, the present invention is by no means limited to such a pattern as different patterns or flat surfaces could be used. Further, the distance "B" shown in FIG. 5B can be adjusted.

Figure 6:
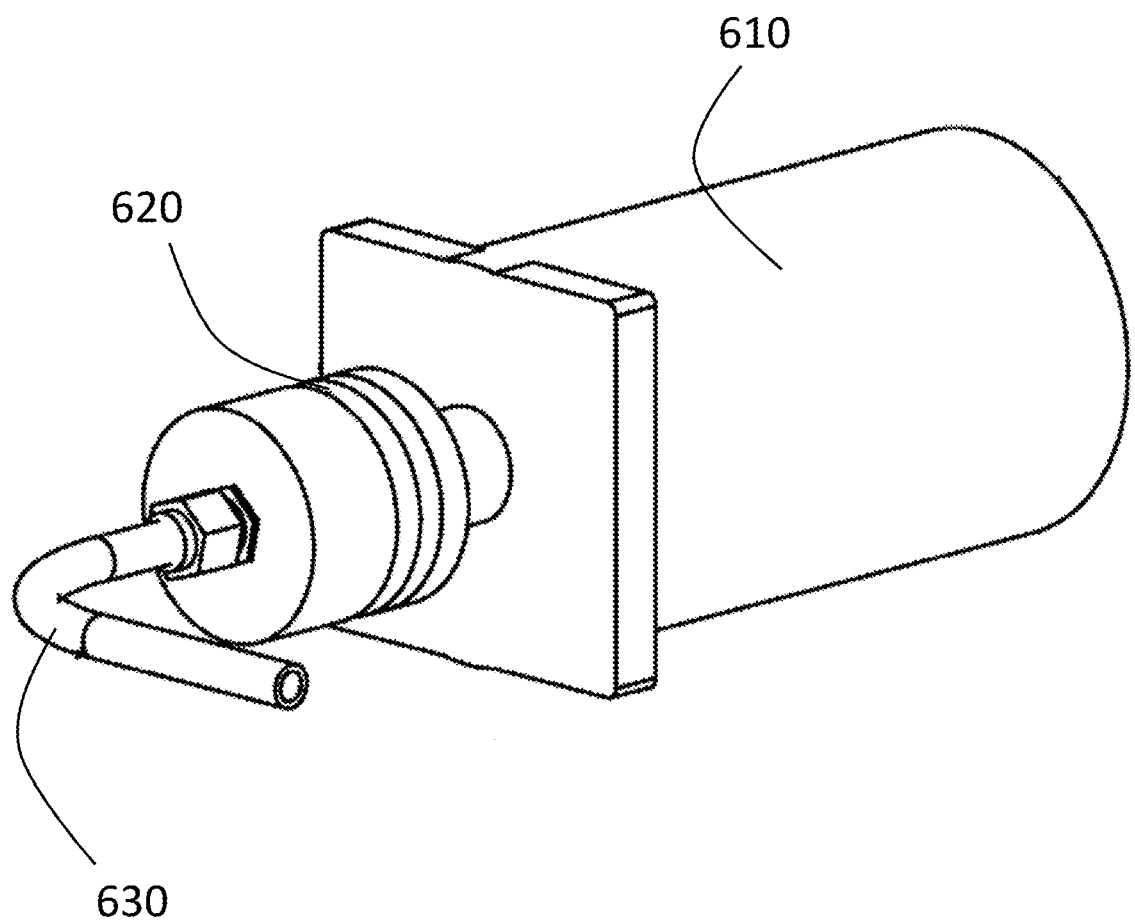
FIG. 6 is a perspective view of a drive wheel assembly in accordance with a preferred embodiment of the present invention.

The bristle drive motor assembly 600, shown in FIG. 6, has a bristle drive motor 610, a clutch 620, and a flexible drive shaft 630. The bristle drive motor 610 powers the bristle head 520 via flexible drive shaft 630. A second flexible drive shaft 550 connects the upper bristle head 530 to the lower bristle head 520 such that they are driven in opposite directions. If coax wire is inserted into the machine too far such that the bristles are "brushing" the outer jacket instead of the exposed braid, the clutch 620 will disengage and rotation of the bristles will stop. While a flexible drive shaft 630 is used in the described embodiment, other arrangements such as a gear or other drive system could be used with the present invention.

The de-braiding machine processes wire based on a stationary wire presentation. A wire or cable (not shown) to be de-braided is placed into the opening 242 in wire guide 240 and is manually held in place. To be effectively used by hand instead of automation, a stop method can be used to give the user a feedback for when the wire should be stopped axially. In an automated solution this would be controlled by a machine holding the wire.

The body 330 of the drive assembly 300 (to which the brush assembly 500 is attached) travels axially and rotates about 40 degrees in an asynchronous fashion. The motion is produced by the axial drive motor 324 and the rotation drive motor 310. While the rotation drive motor 310 rotates in a full circle, the rotation drive crank and rotation drive linkage cause the body 330 to rotate the body a few degrees in a range of 30-50 degrees in a preferred embodiment. However, the present invention may be used with rotation of more or less than 30-50 degrees. The axial drive motor 320 rotates a full circle. The axial drive crank 322 and axial drive linkage 324 cause the body 330 to travel back and forth for a small stroke, the length of the required area to be unbraided.

Figure 7A:
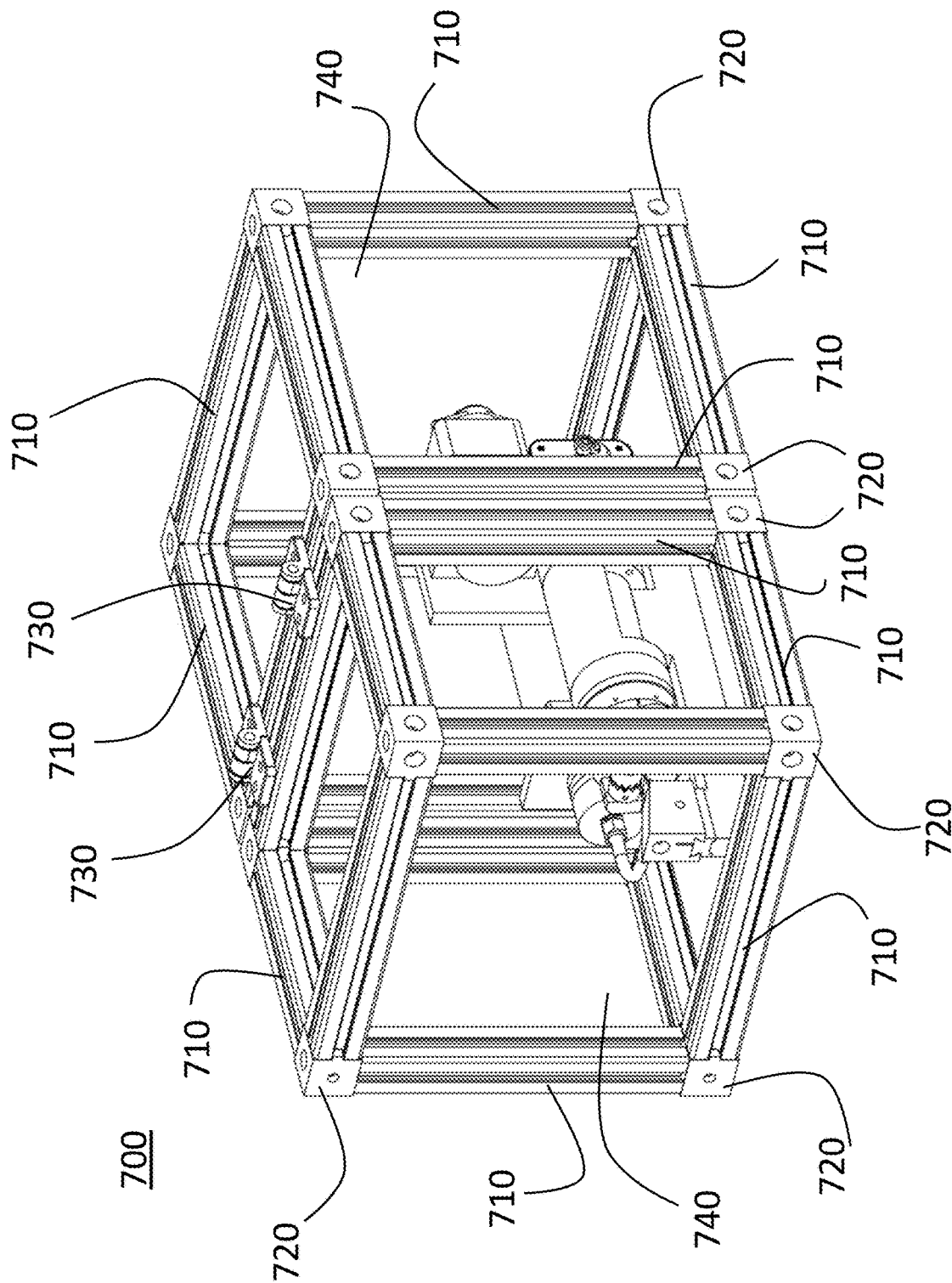
FIG. 7A is a perspective view of a de-braider machine case assembly in accordance with a preferred embodiment of the present invention.
Figure 7B:
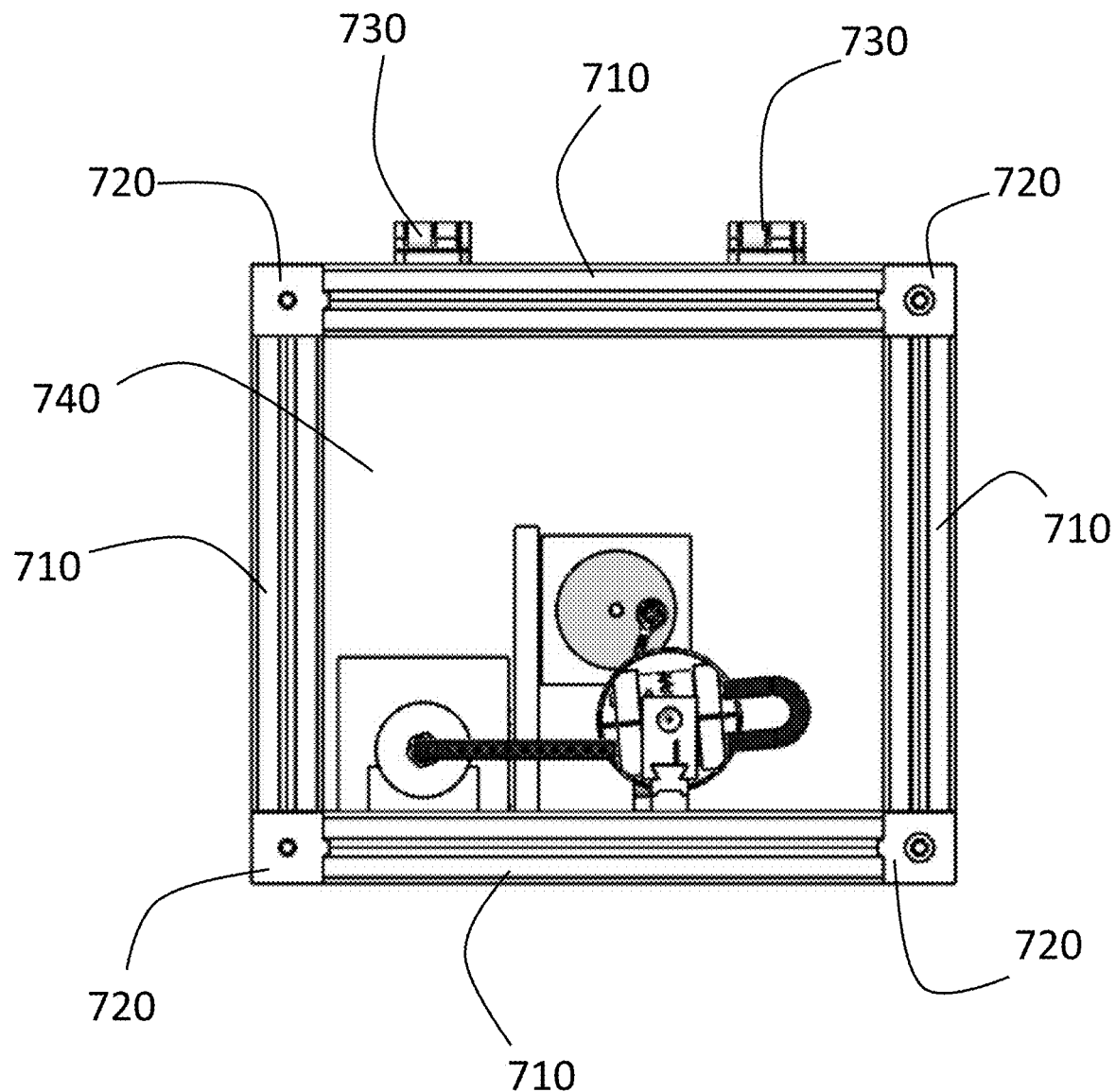
FIG. 7B is a front view of a de-braider machine case assembly in accordance with a preferred embodiment of the present invention.
Figure 7C:
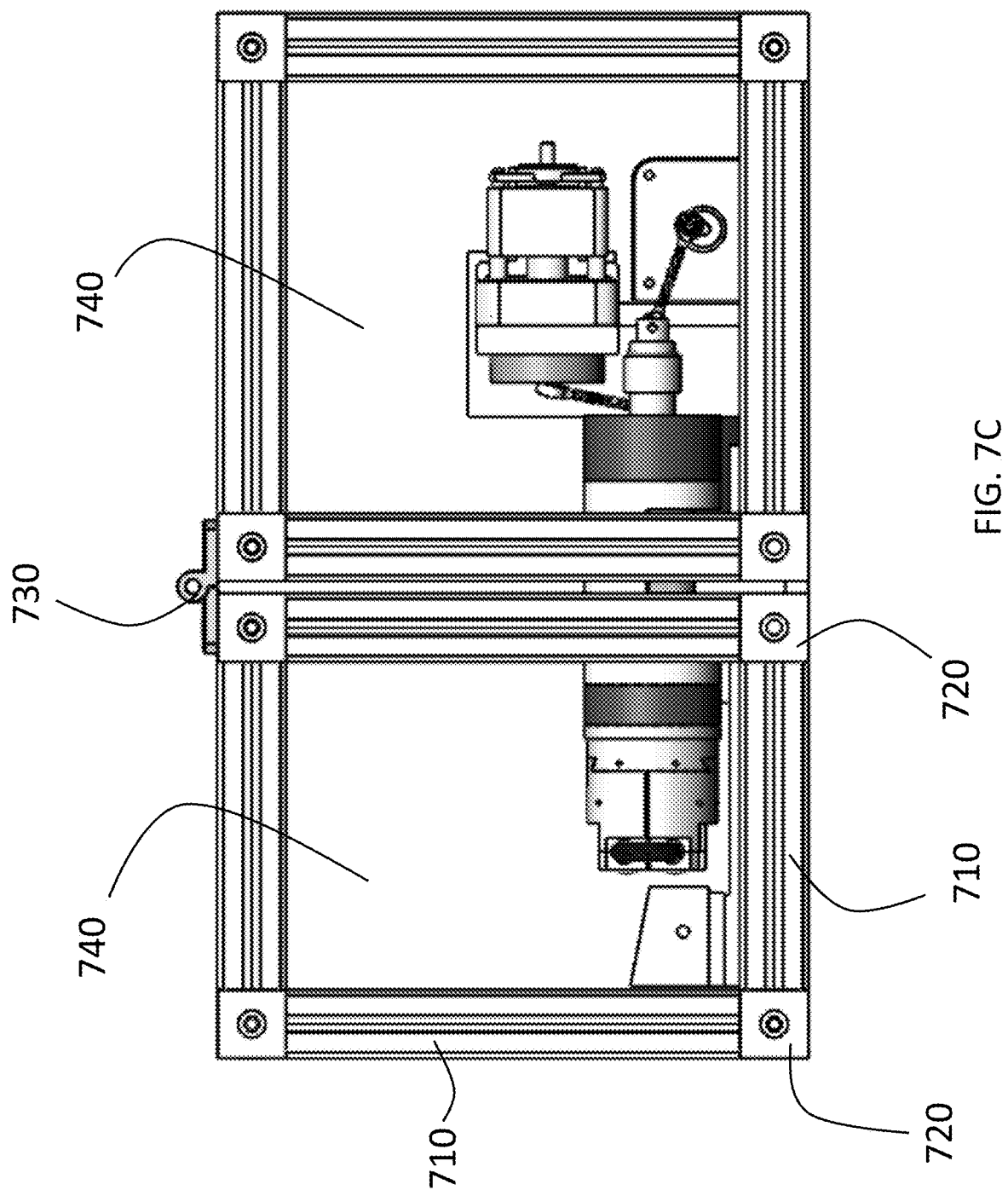
FIG. 7C is a right side view of a de-braider machine case assembly in accordance with a preferred embodiment of the present invention.
Figure 7D:
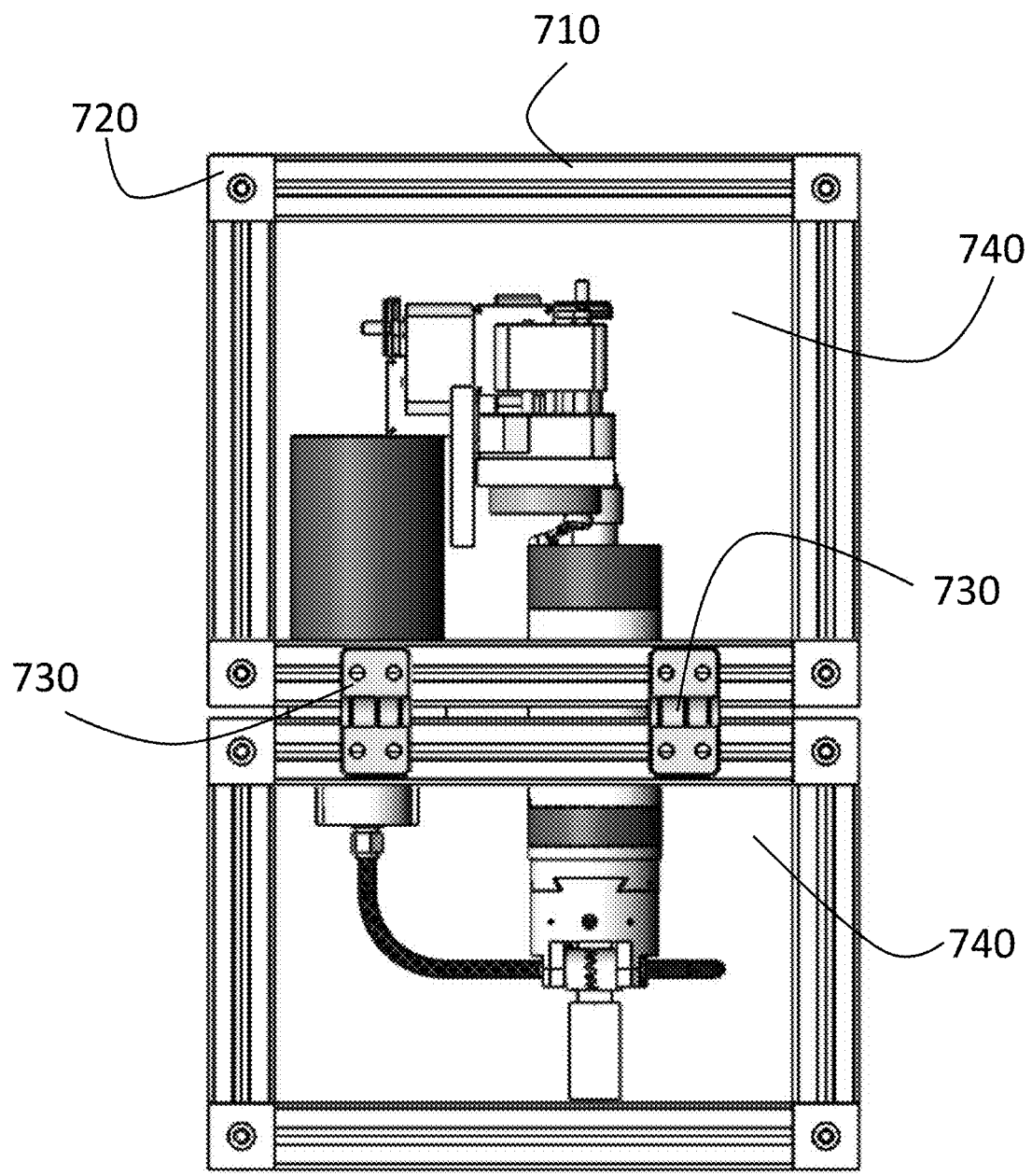
FIG. 7D is a top view of a de-braider machine case assembly in accordance with a preferred embodiment of the present invention.
Figure 7E:
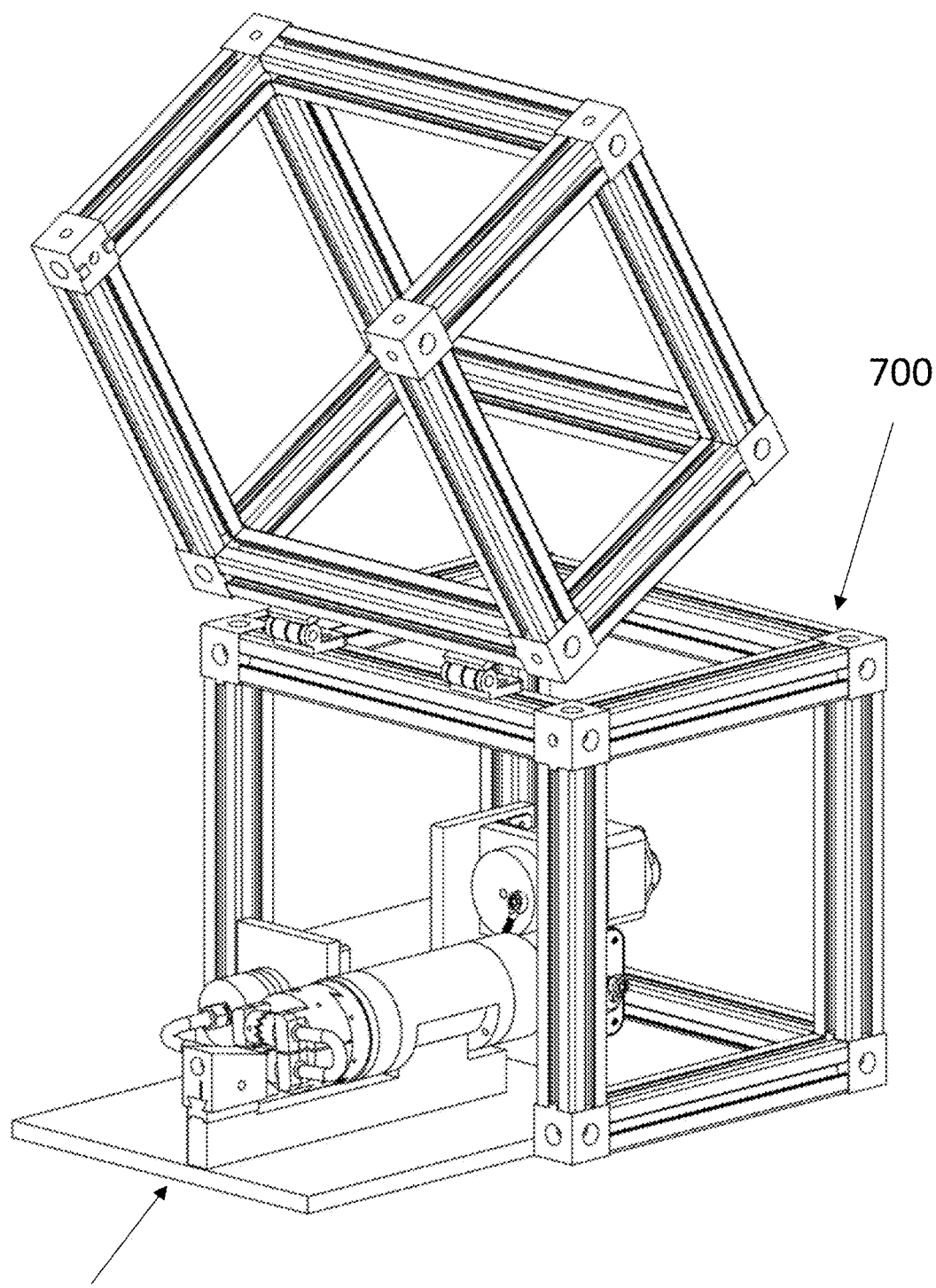
FIG. 7E is a perspective view of a de-braider machine case assembly in accordance with a preferred embodiment of the present invention illustrating how the case is opened.

The de-braiding machine 100 may be enclosed in a case 700, as shown in FIGS. 7A-7E. The case 700 has a plurality of frame members 710, a plurality of connectors 720, a plurality of clear panels 740 and a pair of hinges 730. In the exemplary case 700 shown in FIGS. 7A-7E the hinges 730 allow the case to be opened as shown in FIG. 7E to access the de-braiding machine 100.

When used, a wire is inserted into the opening 242 in the guide 240. When the machine is activated, the bristle assembly 500 moves in and out and rotates back and forth (10-40 degrees in a preferred embodiment). The bristle wheel heads 520, 530 rotate in opposite directions. In this manner the rotating bristle wheels de-braid and flare the braided shield of the wire.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An apparatus for de-braiding a braided shield of a wire, comprising:
    a brush assembly comprising:
        a first bristle wheel mounted on a first axle; and
        a second bristle wheel mounted on a second axle;
        wherein said first bristle wheel and said second bristle wheel are positioned with respect to one another to have their respective bristles brush against a braided shield of a wire placed between the first and second bristle wheels;
    a wheel drive motor;
    a first drive shaft connecting said wheel drive motor to said first axle to rotate said first bristle wheel;
    a second drive shaft connecting said first axle to said second axle to rotate said second bristle wheel; and
    a drive assembly, wherein said drive assembly moves said brush assembly both axially and rotationally with respect to a wire placed between said first bristle wheel and said second bristle wheel.

2. The apparatus for de-braiding a braided shield of a wire according to claim 1, wherein said first drive shaft comprises a flexible drive shaft.

3. The apparatus for de-braiding a braided shield of a wire according to claim 1, wherein said second drive shaft comprises a flexible drive shaft.

4. The apparatus for de-braiding a braided shield of a wire according to claim 1, wherein said first axle and said second axle are parallel.

5. The apparatus for de-braiding a braided shield of a wire according to claim 4, wherein a distance between said first axle and said second axle is adjustable.

6. The apparatus for de-braiding a braided shield of a wire according to claim 1, wherein said brush assembly further comprises:
    a first bristle head comprising:
        a first bristle member;
        a second bristle member; and
        said first bristle wheel;
        wherein said first and second bristle support members are adjustably mounted to said first axle on opposite sides of said first bristle wheel.

7. The apparatus for de-braiding a braided shield of a wire according to claim 6, wherein said brush assembly further comprises:
    a second bristle head comprising:
        a first bristle member;
        a second bristle member; and
        said second bristle wheel;
        wherein said first and second bristle support members of said second bristle head are adjustably mounted to said second axle on opposite sides of said first bristle wheel.

* * * * *